United States Patent [19]

Bryan et al.

[11] Patent Number: 6,124,856
[45] Date of Patent: *Sep. 26, 2000

[54] METHOD AND APPARATUS FOR DISPLAYING MODELESS BAR INTERFACES IN A COMPUTER SYSTEM

[75] Inventors: Edward P. Bryan, Lawrenceville; William H. Jones, Atlanta, both of Ga.; Paul B. Moody, Londonderry, N.H.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/637,310

[22] Filed: Apr. 24, 1996

[51] Int. Cl.[7] ....................................................... G06F 3/00
[52] U.S. Cl. ............................................ 345/343; 345/344
[58] Field of Search ..................................... 345/343, 340, 345/341, 342, 117, 346, 326–339, 344, 345, 347–353

[56] References Cited

U.S. PATENT DOCUMENTS

| | | | |
|---|---|---|---|
| 5,666,498 | 9/1997 | Amro | 34/342 |
| 5,675,755 | 10/1997 | Trueblood | 345/346 |
| 5,680,562 | 10/1997 | Conrad et al. | 345/342 |
| 5,682,487 | 10/1997 | Thomson | 345/342 |
| 5,754,809 | 5/1998 | Gandre | 345/343 |

*Primary Examiner*—Steven P. Sax
*Attorney, Agent, or Firm*—Kudirka & Jobse, LLP

[57] ABSTRACT

A display tool allows multiple modeless function interfaces to be displayed in a manner which does not obstruct any previously displayed material. In particular, the size of the interface for a modeless function is determined and the location of previously displayed material modified to accommodate the function so that both can be displayed in a non-obstructed, non-overlapping manner.

22 Claims, 8 Drawing Sheets

/ 320

| ? | Ask the Expert | OK | History | Done |

For help on using the Expert, choose one of these and click OK.

Ask the Expert a How do I..." question in your own words:

Using the Expert
Suggestions for asking questions

| ? | Find & Replace | | | Done |
| --- | --- | --- | --- | --- |
| | Find | ▶ | Find | |
| | Whole words only ▶ | | | Options |
| | Replace with | ▶ | ↓ ↑ | |
| | | | Replace | Replace All |

| ? | Grammar Check | | | Done |
| --- | --- | --- | --- | --- |
| Possible Error: | | ◀ ▶ | Replace | |
| | Clause error. This does not seem to be a complete sentence. | | Skip | Options |
| Error 1 of 1 ▶ | | | Questionable item: | |
| | | | | Explain |

*Figure 3D*

METHOD AND APPARATUS FOR DISPLAYING MODELESS BAR INTERFACES IN A COMPUTER SYSTEM

COPENDING APPLICATIONS

This application is the one of four sibling patent applications filed on an even date herewith and commonly assigned, including U.S. patent 5/890,176, entitled "OBJECT-ORIENTED DOCUMENT VERSION TRACKING METHOD AND APPARATUS", and U.S. patent 5/890,177 entitled "METHOD AND APPARATUS FOR CONSOLIDATING EDITS MADE BY MULTIPLE EDITORS WORKING ON MULTIPLE DOCUMENT COPIES" and U.S. patent application Ser. No. 08/638,908, entitled "METHOD AND APPARATUS FOR CREATING AND ORGANIZING A DOCUMENT FROM A PLURALITY OF LOCAL OR EXTERNAL DOCUMENTS REPRESENTED AS OBJECTS IN A HIERARCHICAL TREE". The subject matter of the above-identified copending patent applications is hereby incorporated by reference.

FIELD OF THE INVENTION

The present invention relates, in general, to data processing systems, and more specifically, to a data processing system capable of displaying graphic interfaces for modeless functions in a manner which does not obstruct preexisting display regions.

BACKGROUND OF THE INVENTION

Numerous software applications, particularly word processors, spreadsheets, and graphics packages, contain sophisticated graphic user interfaces, including dialog boxes and interfaces customized to specific functions invoked by the user while in the application. Frequently used functions may be implemented in a "modeless," manner i.e. the function does not have to be opened and closed each time it is used but remains in a suspended state until resumed by the user. Examples of applications containing modeless functions include WordPerfect version 6.1, commercially available from WordPerfect, Novel Applications Group, Orem, Utah. However, as with WordPerfect version 6.1, modeless functions, such as spell check, at least partially obscure the document viewing region of the graphic user interface, thereby discouraging users from retaining the function interface for extended periods of time. Further, as with WordPerfect 6.1, it is not possible to display more than one modeless function simultaneously.

Accordingly, a need exists for a data processing tool capable of displaying a modeless function interface in a manner which will not obscure preexisting information displayed to the user. A further need exists for a data processing tool which is capable of displaying multiple modeless function interfaces without obstructing the document viewing region of a display. Still further, a need exists for a data processing tool which dynamically modifies the document viewing region depending on the number of modeless function interfaces present on the user interface.

SUMMARY OF THE INVENTION

The above and other objects are achieved with an inventive display tool which displays modeless function interfaces in a manner which does not obstruct the view of currently displayed information. Upon invocation of a modeless function, the size requirement of the corresponding interface is determined and the location of any currently displayed material is modified to allow for display of the modeless function interface so as not to overlap the currently displayed information. If subsequent modeless functions are invoked, the location of the currently displayed information is further modified to allow for display of multiple modeless function interfaces.

In accordance with one embodiment of the present invention, the present invention discloses a computer program product for use with a computer system having a visual display. The computer program product includes a computer useable medium having program code embodied in the medium for displaying a user interface including information and data. Program code, responsive to user invocation of a modeless function, determines the space necessary for displaying the function interface and modifies the location of existing displayed objects, as necessary. Program code is further included for displaying multiple modeless function interfaces in a non-overlapping manner with the currently displayed objects on the user interface.

In another embodiment, a method of displaying modeless function interfaces on a computer system having a visual display includes the steps of determining the space requirements of an invoked modeless function interface, modifying the location of other objects displayed on the user interface, and simultaneously displaying the modeless function interface and the previously displayed objects in a non-overlapping manner simultaneously. The method includes the further steps of determining the space requirements of subsequent modeless function interfaces and further modifying the location of previously displayed objects on the user interface, as required, to display the subsequent modeless function interfaces with the previously displayed objects in a concurrent, non-overlapping manner.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
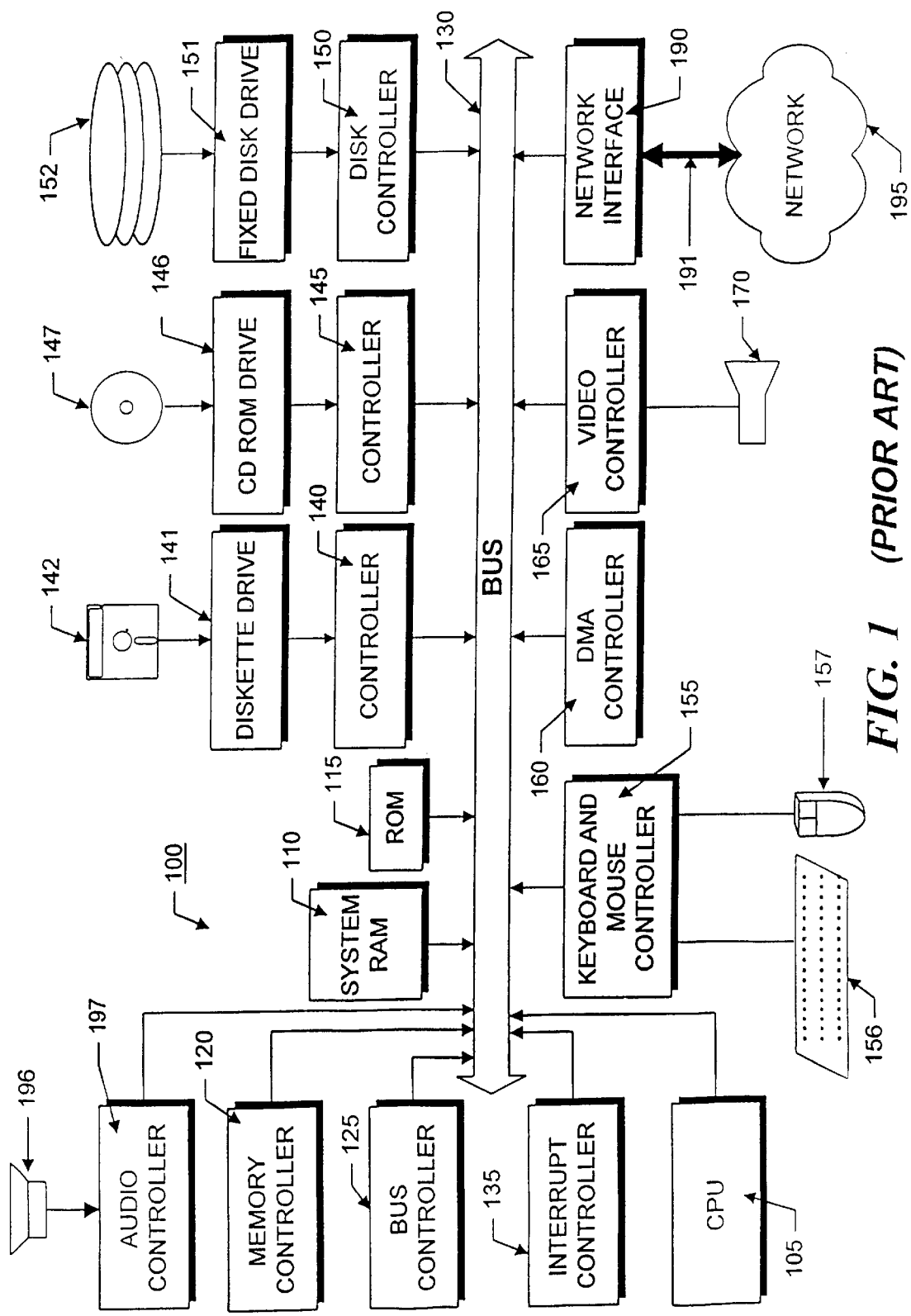
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Figure 2:
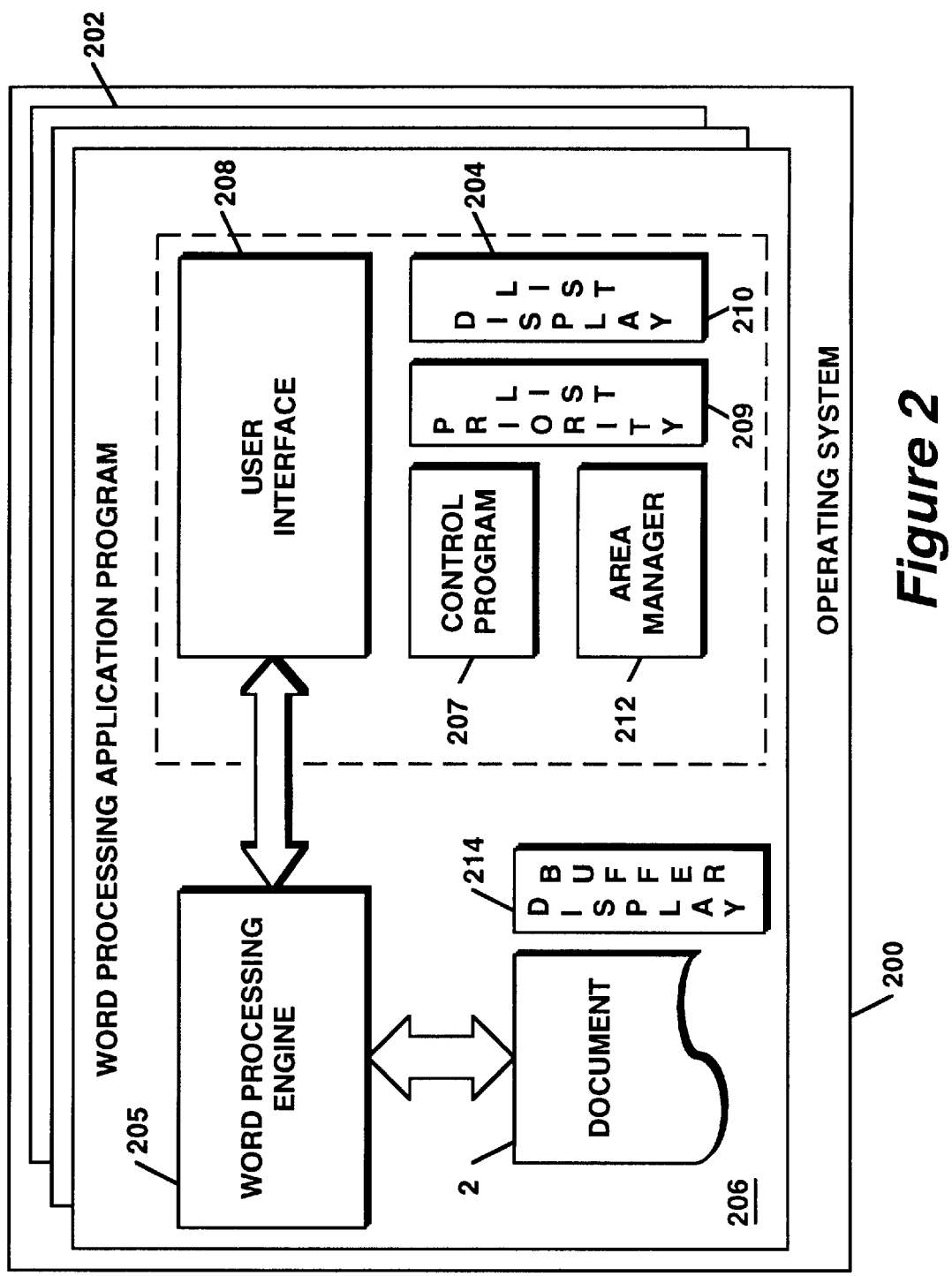
FIG. 2 is a schematic block diagram of the elements comprising the inventive display tool.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. FIG. 2 illustrates schematically the inventive display tool 204 and its components as well as other system components with which the tool interacts. In particular, an operating system 200 resident in system memory and running on CPU 105 coordinates the operation of the other elements of computer system 100. The present invention may be implemented with any number of commercially available operating systems including OS/2, UNIX and DOS, etc. One or more applications 202 such as word processors, editors, spread sheets, compilers, etc., execute in order to control the operating system 200. If operating system 200 is a true multitasking operating system, such as OS/2, multiple applications may execute simultaneously.

Display tool 204 may be implemented as an integral part of a document authoring application, such as a word processor. In particular, a word processing application suitable for use with the present invention, and to which the illustrative embodiment of the invention will be described, is Lotus Word Pro™, 96 Edition, commercially available from Lotus Development Corporation, Cambridge, Mass., a subsidiary of International Business Machines Corporation. In the illustrative embodiment, display tool 204 is integrated into a word processing application 206. Word processing application 206 further comprises word processing engine 205, user interface 208, and display buffer 214.

In a preferred embodiment, the word processing application 206 and display tool 204 are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Display tool 204 comprises control program 207, priority definition list 209, area manager 212, and display list 210. In the illustrative embodiment, program code 207 as well as word processing application 206 may be implemented in an object-oriented programing language such as C++. Accordingly, the data structures used to represent modeless function interfaces, hereafter referred to as modeless bars, and other objects displayable by application 206 may be objects or groups of objects. The construction and function of word processing engine 205, user interface 208 and display buffer 214 are within the scope of understanding of those reasonably skilled in the arts and will not be detailed here for brevity.

Figure 3A:
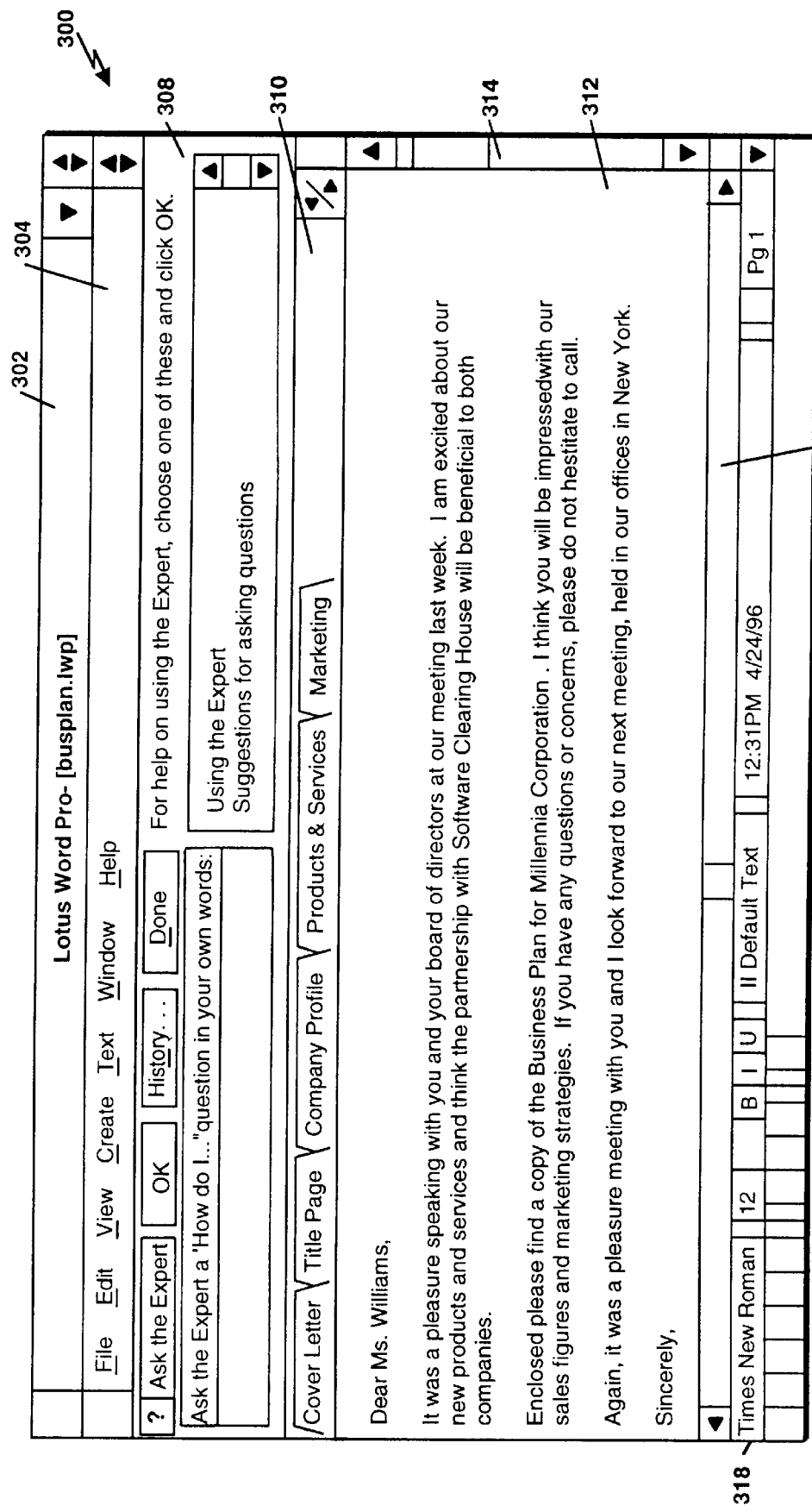
FIGS. 3A–D illustrates schematically exemplary modeless bar interfaces in accordance with the present invention.

FIGS. 3A–E illustrates schematically the graphic interfaces of exemplary modeless bars in accordance with the illustrative embodiment. In particular, FIG. 3A illustrates a user interface 300 in accordance with the illustrative embodiment of the invention. As illustrated, user interface 300 comprises a title bar 302 describing the application as well as the file name, a menu bar 304 displaying menu option selectable by the user, and a document viewing region 312 for displaying the text and/or graphics comprising a document. In addition, user interface 300 may include divider tabs 310, indicating the title and location of divisions within a document, a vertical scroll bar 314, a horizontal scroll bar 316, and status bar 318 which contains status information relative to the currently viewed document.

FIG. 3A further illustrates a modeless bar 308 in accordance with the illustrative embodiment of the present invention. As illustrated, the modeless function illustrated by bar 308 is a help function. Generally, a modeless bar contains the same components as the dialog box, i.e., list boxes, text boxes, arranged into a compact bar-shaped interface. In the illustrative embodiment, bar 308 is implemented as an object which, in turn, comprises a series of other objects having data attributes representing the characteristics of the bar, including its visual representation. Such objects capable of performing methods on such data members and attributes. Upon selection of the appropriate menu option, user interface 208 commands word processing engine 205 to initiate an instance of the selected modeless function object. Multiple instances of the same modeless function object may be initiated simultaneously, i.e., each document currently open by word processing application 206 may have its own copy of a modeless function interface in accordance with the present invention.

FIGS. 3B–C illustrate the modeless bar interfaces of other functions in accordance with the illustrative embodiment of the invention. In particular, FIG. 3B illustrates a modeless bar interface 320 for a help interface function labeled as "Ask the Expert." The construction and operation of such a function is described in greater detail in copending U.S. patent application Ser. No. 08/636,663, entitled "Natural Language Help Interface," filed Apr. 23, 1996, which is commonly assigned and incorporated herein by reference. FIG. 3C illustrates a modeless bar interface 322 for a find and replace function in accordance with the illustrative embodiment of the invention. Other functions suitable for implementation as modeless bar interfaces in accordance with the illustrative embodiment include format check functions, grammar check functions, index and table of contents functions, merge functions, review functions, etc. FIG. 3D illustrates a modeless bar interface 324 of a grammar check function in accordance with the illustrative embodiment of the present invention.

In addition to the ability to display multiple instances of the same modeless bar interface, the inventive display tool 204 enables the simultaneous display of different modeless bar interfaces within the same document view, as illustrated in FIG. 3D. In particular, FIG. 3D is similar to FIG. 3A except that in addition to modeless bar 308, the find and replace modeless bar interface 322 of FIG. 3C and the check grammar modeless bar interface 324 of FIG. 3D have been simultaneously invoked for the same document.

Figure 3E:
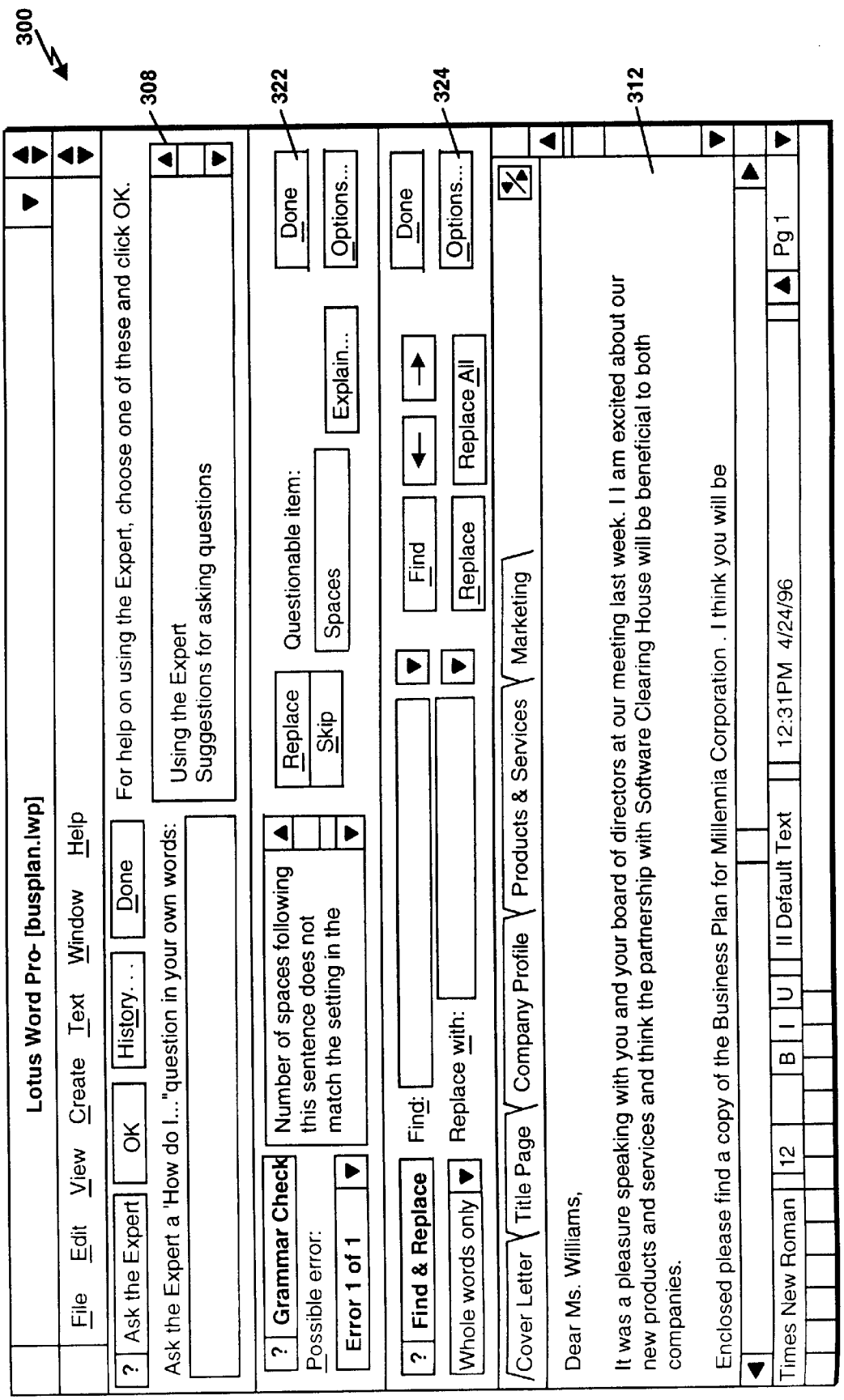

As illustrated in FIG. 3E, multiple modeless bars may be invoked simultaneously and their respective interfaces displayed simultaneously on the user interface 300 without obstructing the document display region 312, or each other. The algorithmic steps used to achieve such a result are illustrated in the flow chart of FIG. 4B in conjunction with the data structures schematically illustrated in FIGS. 4A–B.

Figure 4A:
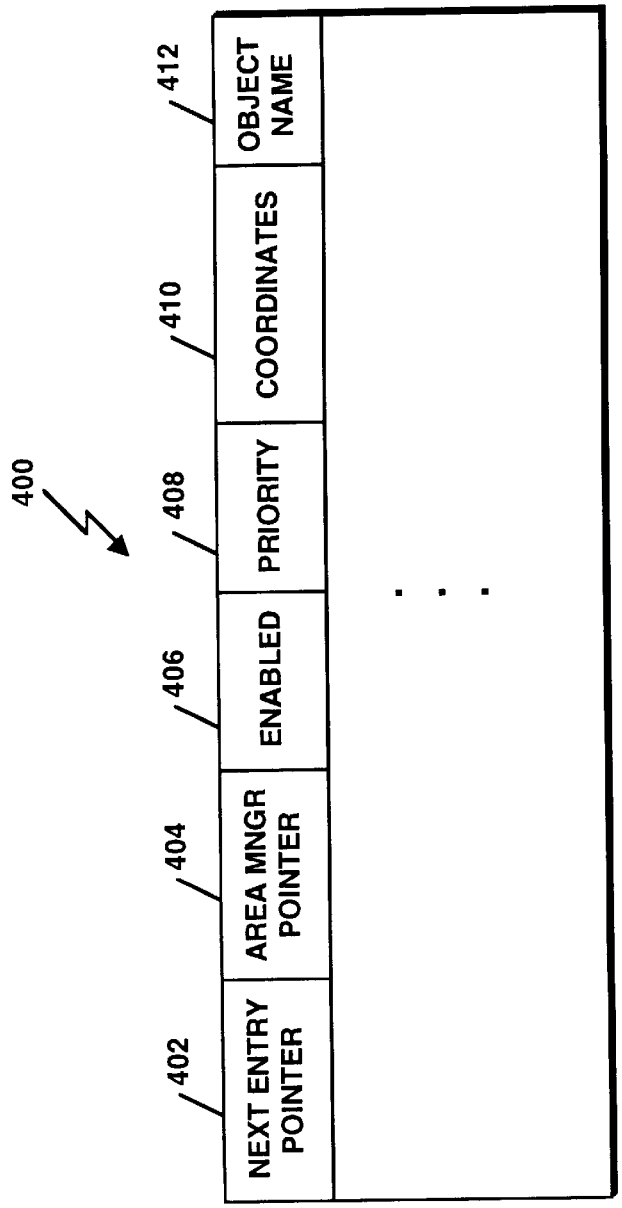
FIG. 4 illustrates schematically list-type data structures suitable for use with the present invention.

FIG. 4A illustrates a display list 400 suitable for implementing display list 210 of FIG. 2. In particular, each entry of display list 400 represents a displayable object and includes a next pointer field 402, an area manager pointer 404, an enable field 406, a priority field 408, a coordinates field 410, and an object name field 412.

Pointer field 402 may be implemented with an object pointer and references the next entry in table 400. Pointer 404 may likewise be implemented with an object pointer and serves as a reference back to the area manager 212 of FIG. 2. Enabled field 406 may be implemented with a Boolean variable and indicates whether the entry is currently enabled, i.e., displayable at a given instance. Priority field 408 may be implemented with an integer value and indicates the predetermined priority of the entry in relation to other objects displayable on the system. Coordinates field 410 may be implemented as a four value integer coordinate, i.e. (left, top, right, bottom), representing the remaining unused portion of the display buffer in pixel units. Object field 412 comprises a reference to the displayable object and may be implemented with an alphanumeric character string. In an alternative embodiment, object field 412 may be eliminated in its entirety. Additionally, coordinate field 410 may be implemented as a two value coordinate, representing the width and the height of the remaining displayed buffer area, or, with other positional type of data which is dynamically modifiable.

Figure 4B:
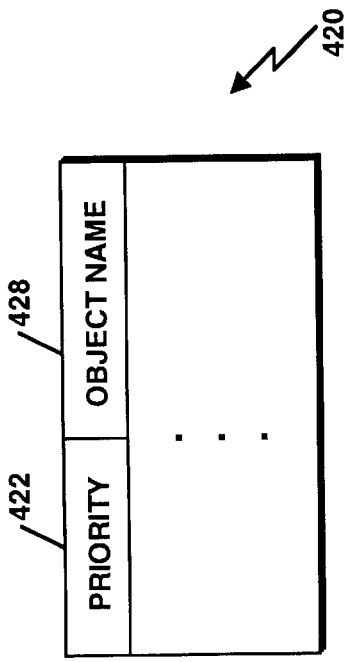

FIG. 4B illustrates a list 420 suitable for implementing the priority definition list 209 of FIG. 2. In particular, each entry of list 420 represents a displayable object and includes an object field 422, similar to object field 412 of list 400, and a priority field 428, similar to priority field 408 of list 400. List 420 may be used as a reference for area manager 212 and is described herein to facilitate a better understanding of the inventive display tool. It will be obvious to those reasonably skilled in the arts that the invention may be implemented without a priority display list 209, the priority information for the displayable objects instead being inherently contained within the data members of such objects.

Figure 5A:
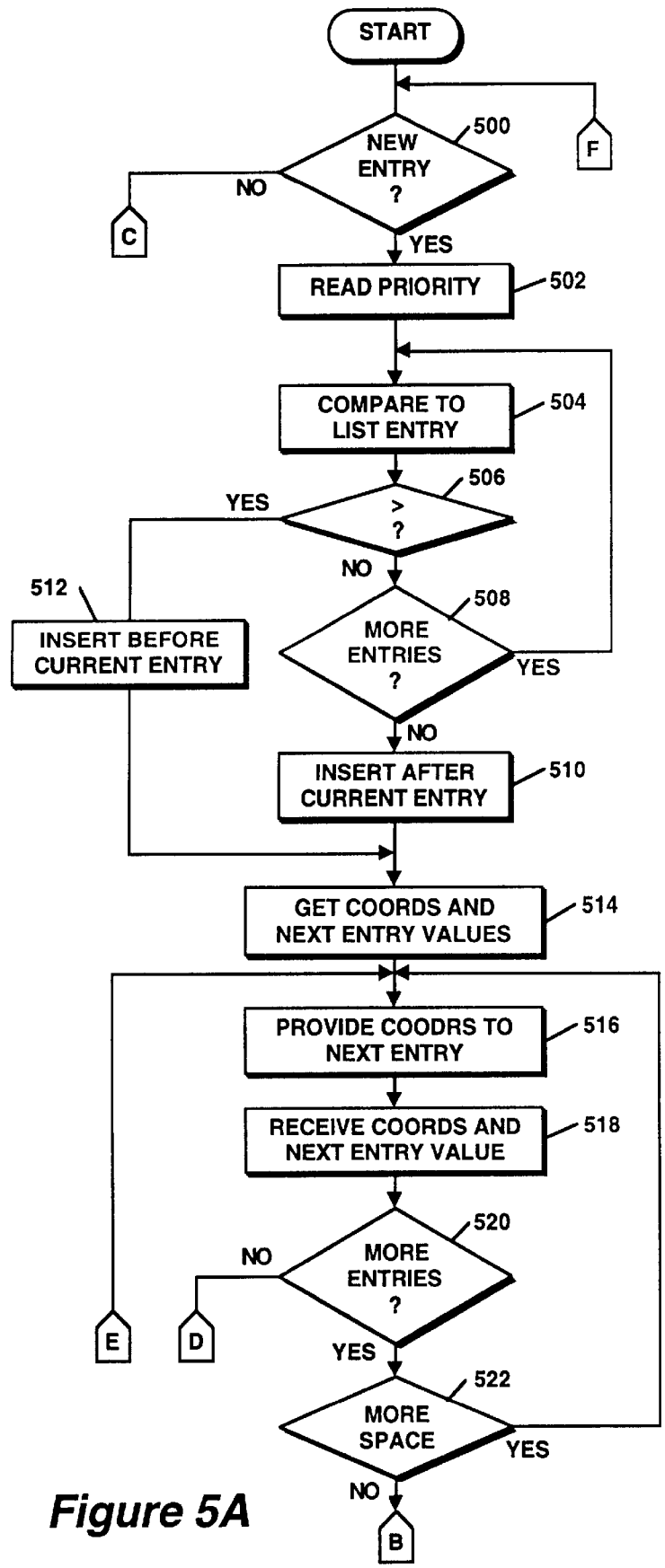
FIGS. 5A–B for a composite flow chart illustrating the algorithmic steps in accordance with the display tool of the present invention.
Figure 5B:
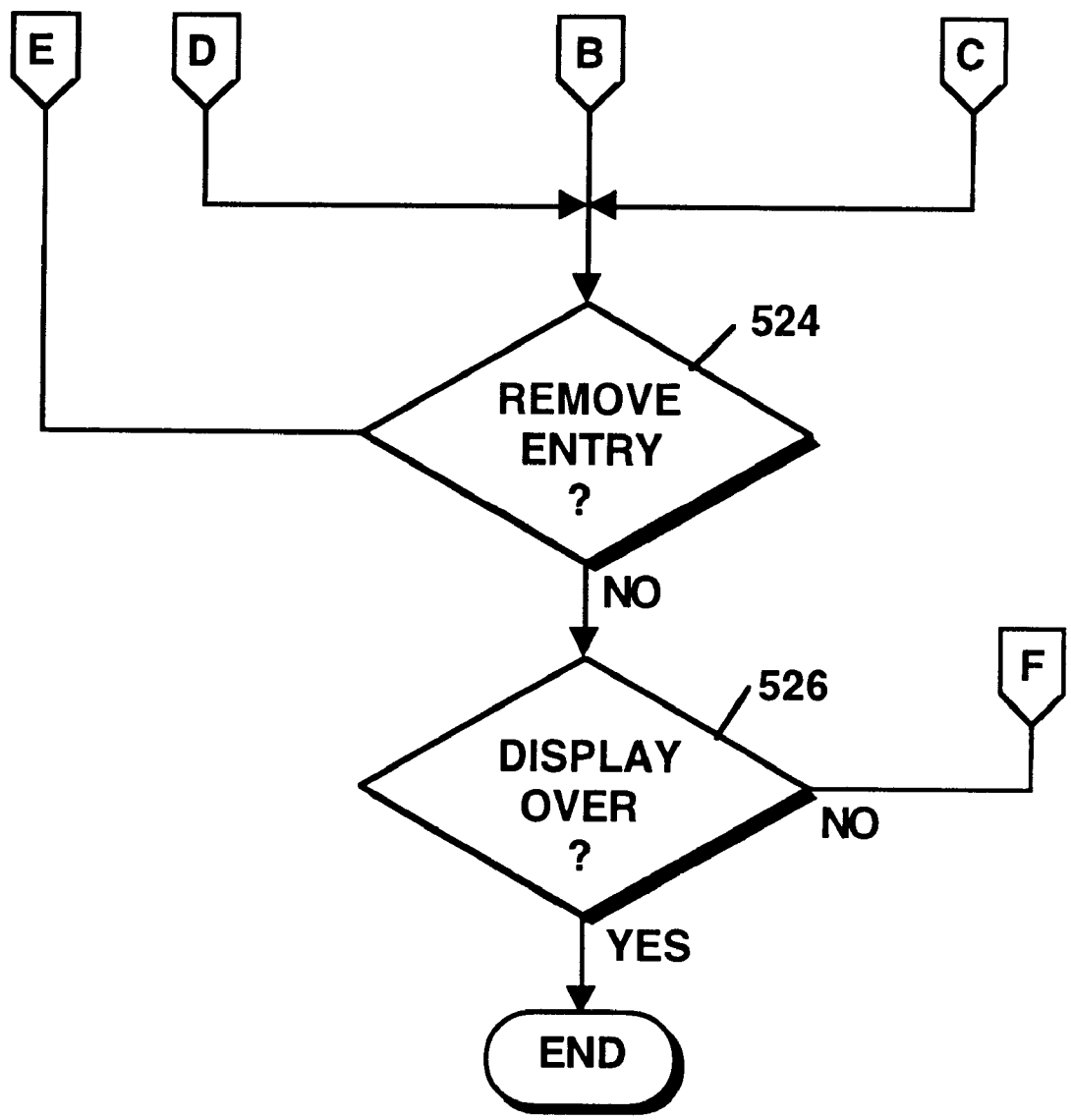

Referring to FIGS. 5A–B a flow chart of the algorithmic steps performed by area manager 212 and control program 207 to achieve display of modeless bar interfaces in accordance with the present invention as illustrated. In particular, as long as a document is being displayed by word processing application 206, area manager 212 is active. If a new object is to be displayed as illustrated with decisional block 500 of FIG. 5A, area manager 212 obtains the priority value for the displayed object, as indicated by procedural block 502. The priority value may be stored as an attribute of the actual object to be displayed or can be read from priority definition list 209 once the object has been identified. The new entry is compared to the other entries of display list 210. In particular, area manager 212 compares the priority of the new object with priority of the first entry in display list 210, as illustrated by procedural block 504. If the priority of the new object is greater than the priority of the first entry, as illustrated by decisional block 506, the information relative to the new object is inserted before the compared first entry in display list 210, as illustrated by procedural block 512. If, however, the priority of the new display object is less than the first entry of list 210, area manager 212 determines if there are more entries in display list 210, as indicated by decisional block 508, and, if so, compares the priority of the new display object with the next entry of display list 210. If, however, there are no more entries in the display list, the information for the new display object is entered after the currently compared entry of list 210, indicating that the new display entry is the lowest priority in list 210.

Once the information for the new display object has been entered into display list 210 in accordance with its proper priority, the display is resized, i.e., the various objects are rearranged within the display buffer so that they are not overlapping. In particular, area manager 212 obtains the most recent coordinates representing the unused pixel portion of the display buffer and the value of a pointer to the next entry in list 210. In the event an object is being added to the display, the coordinate value is related to the size of the display buffer and the entry value may be first entry in display list 210. In the event an entry is being removed from the display, the coordinate value and the pointer value to the next entry may be obtained from the display list entry immediately proceeding the removed object entry. The process of obtaining the coordinate and next entry value is illustrated by procedural block 514 of FIG. 5A. Next, the coordinate value representing the remaining unused portion of the buffer is provided by area manager 212 to the next entry in list 210, as indicated by procedural block 516. The object identified by field 412 of the entry checks first to see if it is currently enabled, i.e., displayable, and then, using the coordinate value supplied by area manager 212, subtracts its required size from the remaining area within the display buffer.

An object subtracts its required size from the remaining are of the display buffer, typically by calling an object method which determines the interface region required for displaying the bar interface and subtracts the region from the remaining area of the displayed buffer. Using the value of coordinate field 404, the object then returns the modified coordinate value and a pointer to the next entry in list 210 back to area manager 212. The area manager receives these values, as indicated by procedural block 518 and, using the pointer value to the next entry, determines whether more entries exist in display list 210, as indicated by decisional block 520.

If more entries exist, area manager 212 determines whether or not more space is available for display as indicated by decisional block 522. If there are no more entries in list 210, area manager 212 determines whether or not any entries have been removed as indicated by decisional block 524. If, in decisional block 522 area manager 212 determines that more space is available within the display buffer, the remaining coordinate value and next entry pointer value received from the prior object are provided to the next priority entry of list 210, as indicated. If, in decisional block 524 it is determined that no entries have been removed from the display buffer, area manager 212 determines whether or not the display is currently active, and, if not, awaits either the addition or removal of a new object from display list 210. Finally, if the display is no longer current, the inventive process ends. In an alternate embodiment, the area manager 212 may go through a resizing procedure, similar to that when a display object is either removed or added to the display list, if the user manually resizes the display.

Using the inventive process described above, the inventive display tool is capable of displaying multiple modeless bars in conjunction with a document or other information, the number of modeless bars being limited only by the actual size of the display buffer of the system.

Although several embodiments of the invention have been disclosed, it will be apparent to those skilled in the art that various changes and modifications can be made which will achieve some of the advantages of the invention without departing from the spirit and scope of the invention. These and other obvious modifications are intended to be covered by the following claims.

What is claimed is:

1. A computer program product for use with a computer system having a visual display, the computer program product comprising:

a computer useable medium having program code means embodied in the medium for displaying a document, the medium further comprising:
program code means for generating a modeless function associated with the document and having a graphic interface with a predetermined size;
program code means, responsive to the invocation of the modeless function, for displaying the modeless function user interface in a manner which does not obstruct or cause any previously displayed information on the computer system display to overlap.

2. The computer program product of claim 1 further comprising:

program code means for generating a second modeless function having a user interface with a predetermined size, and wherein the program code means for displaying further comprises program code means for displaying the second modeless function user interface simultaneously with the first modeless function user interface in a manner which does not obstruct previously displayed information on the computer system display.

3. The computer program product of claim 1 further comprising program code means, responsive to the invocation of a modeless function, for determining the space necessary for displaying the modeless function user interface.

4. The computer program product of claim 3 further comprising:

program code means, responsive to the program code means for determining, for modifying a location of the previously displayed information on the computer system display.

5. In a computer system having a memory for storing executable programs, a processor coupled to the memory for executing the programs, and a display, coupled to the processor and the memory, for displaying a user interface, at least one document an apparatus for displaying modeless functions comprising:

means for storing a plurality of objects displayable by the computer system, each object having associated herewith a priority value;

means for maintaining a list of objects which are currently displayed in order of priority;

means for modifying the list as objects are added and removed from the display;

wherein at least one of the display objects is a modeless function associated with the document and having a predefined user interface and the modeless function user interface is fully displayed in such a way so as not to obstruct the document on the computer display.

6. The apparatus of claim 5 wherein at least a second of the display objects is a modeless function having a predefined user interface, display apparatus further comprising:

means for displaying both modeless function user interfaces concurrently without obstructing the other display objects on the computer system display.

7. In a computer system having a display capable of displaying documents, a method of displaying modeless function interfaces, the method comprising the steps of:

A. upon invocation of a first modeless function in association with an application displaying an active document, determining the space required for display of the first modeless function interface;

B. modifying the size of a display region used to view the document without overlap; and C. displaying the modeless function interface currently with, and in a manner which does not obstruct, the display region for viewing the document.

8. The method of claim 7 further comprising the steps of:

D. upon the invocation of a second modeless function, determining the space required for display of a for the second modeless function user interface; and E. displaying the first and second modeless function interfaces concurrently in a manner which does not obstruct the display region for viewing the document.

9. A computer program product for use with a computer system having a visual display, the computer program product comprising:

a computer useable medium having program code means embodied in the medium for displaying a document, the medium further comprising:

program code means for displaying a first document in a first window on the computer system display;

program code means, responsive to an invocation of a first modeless function associated with an application displaying the first document, for displaying a user interface associated with the first modeless function in a manner which does not obstruct the first document displayed in the first window;

program code means, responsive to the invocation of a second modeless function, for displaying a user interface associated with the second modeless function, in a manner which does not obstruct the user interface of the first modeless function and the first document.

10. The computer program product of claim 9 further comprising:

program code means for displaying a second document within a second window in the computer system display; and program code means responsive to invocation of a third modeless function, for displaying a user interface associated with the third modeless function in a manner which does not obstruct the second document in the second display window.

11. The computer program product of claim 10 further comprising:

program code means, responsive to invocation of a fourth modeless function, for displaying a user interface associated with the fourth modeless function in a manner which does not object the user interface of the third modeless function and the second document in the second window.

12. The computer program product of claim 11 wherein the user interface of the first modeless function and the user interface of the second modeless function are displayed concurrently with the first document.

13. The computer program product of claim 11 wherein the user interface associated with the third modeless function and the user interface associated with fourth modeless function are displayed concurrently with the second document in the second window.

14. The computer program product of claim 13 wherein the first and third modeless functions are implemented as objects having a common class definition.

15. The computer program product of claim 14 wherein the third modeless function is an instance of the same object comprising the first modeless function.

16. In a computer system having a display and being capable of displaying documents within predefined window regions of the display, a method of displaying modeless function interfaces comprising the steps of:

A. displaying a first document in a first window on the computer system display;

B. upon invocation of a first modeless function associated with an application displaying the first document, displaying a user interface associated with the first modeless function in a manner which does not obstruct the first document in the first window; and C. upon invocation of a second modeless function, displaying a user interface associated with the second modeless function in a manner which does not obstruct the first document displayed in the first window.

17. The method of claim 16 further comprising the steps of:
  D. displaying a second document in a second window on the computer system display; and
  E. upon invocation of a third modeless function, displaying a user interface associated with the third modeless function in a manner which does not obstruct the second document displayed in the second window of the display.

18. The method of claim 16 further comprising the step of:
  displaying the user interface associated with the first modeless function in a manner which does not obstruct the second document displayed in the second window on the computer system display.

19. The method of claim 16 wherein step B further comprises the step of:
  B1. determining the space required for display of the user interface associated with the first modeless function;
  B2. modifying the size of the first window in which the first document is displayed; and
  B3. redisplaying the first document within the first window.

20. The method of claim 16 wherein step C further comprises the steps of:
  C1. determining the space required for display of the user interface associated with the second modeless function; and
  modifying the size of the first window used to display the first document; and
  C3. redisplaying the first document within the first window.

21. The apparatus of claim 5 wherein the means for displaying further comprises:
  means for determining the space required for displaying the modeless function user interface.

22. The apparatus of claim 21 wherein the means for displaying the modeless function user interface further comprises:
  means for displaying the plurality of objects on the computer system display; and
  means for modifying the location of at least one other object displayed on the computer system display, such object not being the modeless function.

* * * * *